UNITED STATES PATENT OFFICE.

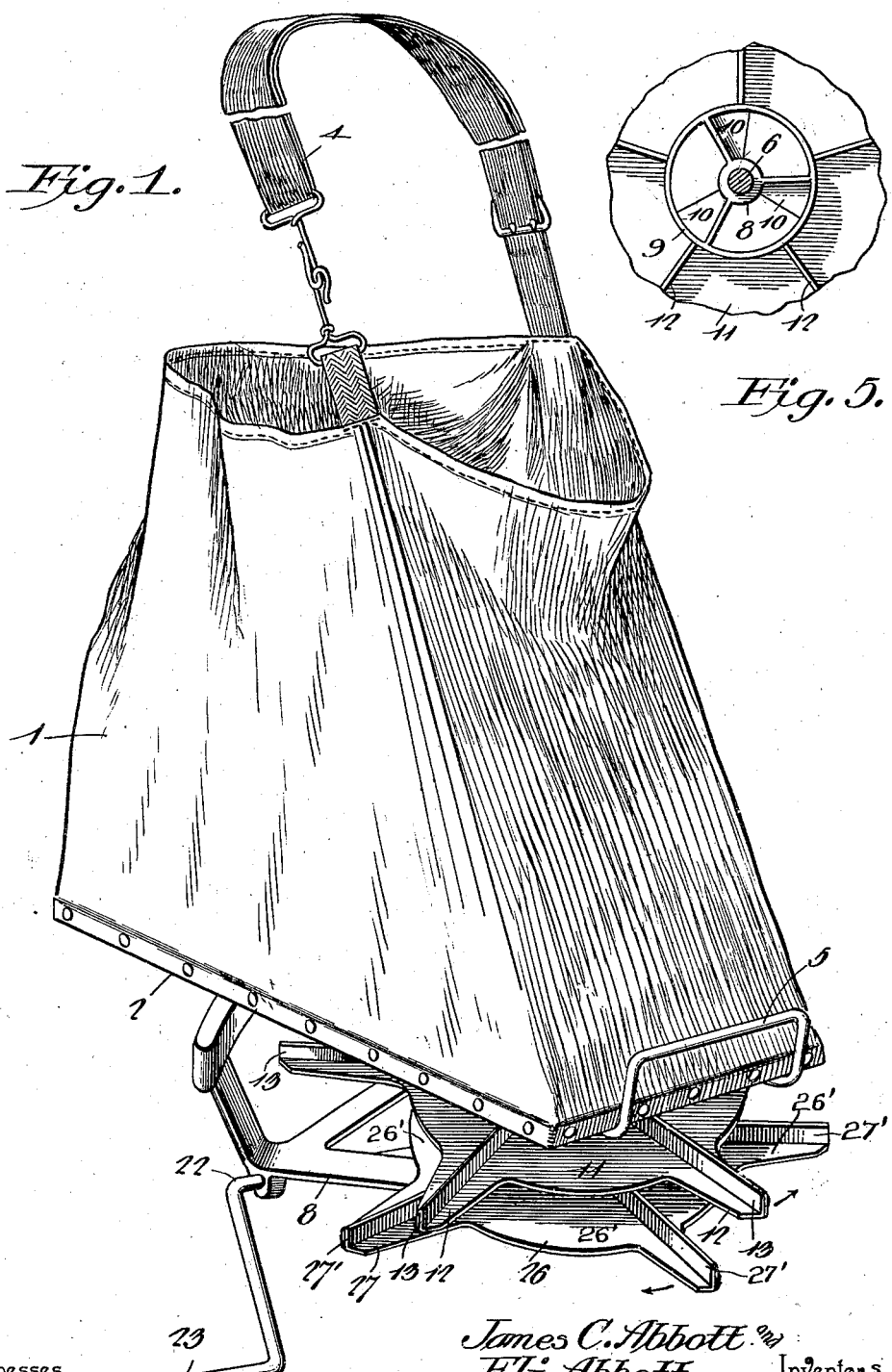

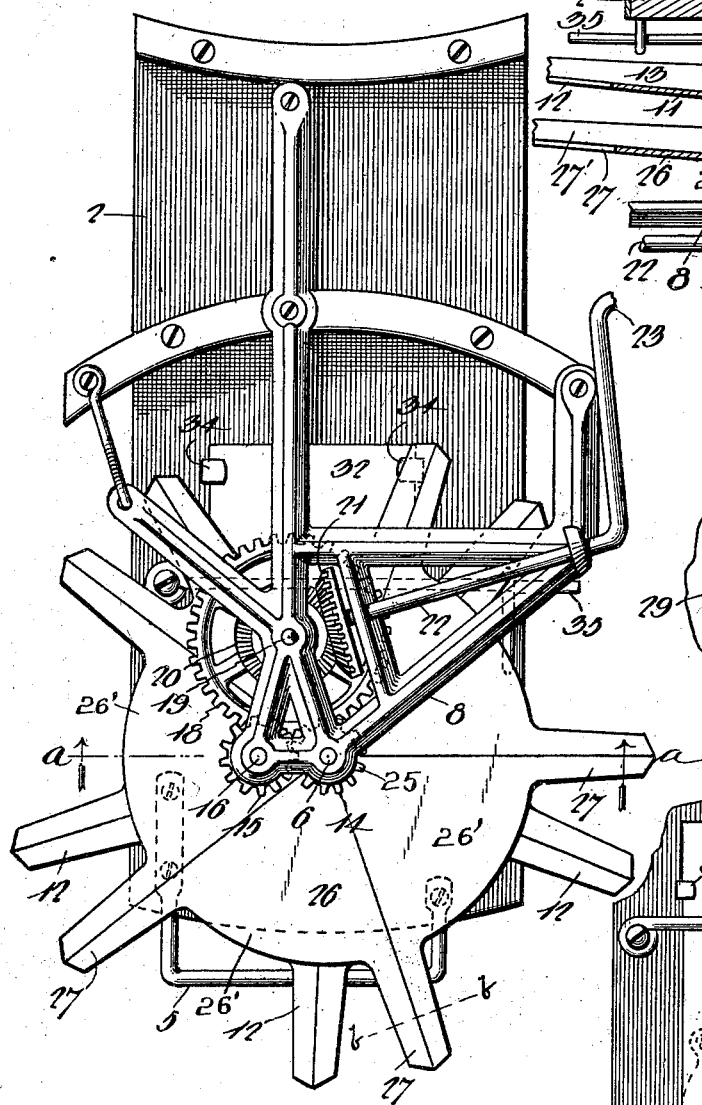

JAMES C. ABBOTT, OF BELLAIRE, MICHIGAN, AND ELI ABBOTT, OF KINZIE, INDIANA; SAID JAMES C. ABBOTT ASSIGNOR OF ONE-HALF OF HIS RIGHT TO LIZZIE H. ABBOTT, OF BELLAIRE, MICHIGAN.

BROADCAST SEEDER.

SPECIFICATION forming part of Letters Patent No. 686,185, dated November 5, 1901.

Application filed May 31, 1901. Serial No. 62,612. (No model.)

*To all whom it may concern:*

Be it known that we, JAMES C. ABBOTT, residing at Bellaire, in the county of Antrim and State of Michigan, and ELI ABBOTT, residing at Kinzie, in the county of Kosciusko and State of Indiana, citizens of the United States, have invented a new and useful Broadcast Seeder, of which the following is a specification.

This invention relates to broadcast seeders, and may be operated by hand or with any other suitable power; and it consists in two reversely-revolving distributing-wheels adapted to receive the seed uniformly from the source of supply and distribute the same equally to both sides of the machine, whereby an increased area is supplied and a more uniform distribution secured.

The invention further consists in the mechanism whereby an equal amount of the grain is supplied to each distributing-wheel at the same time.

The invention further consists in the construction, combination, and arrangement of parts, as hereinafter shown and described, and specifically pointed out in the claims.

The device may be employed in connection with a hand-operated seeder or arranged in connection with any power broadcast-seeding machine, but for the purpose of illustration we have shown it in the drawings arranged in connection with a hand-seeder.

Figure 1 is a perspective view of the device complete. Fig. 2 is a bottom plan view. Fig. 3 is a transverse sectional detail on the line *a a* of Fig. 2. Fig. 4 is a detail illustrating the construction of the feed-regulating mechanism. Fig. 5 is a detached detail illustrating the construction of the central portion of the upper distributing-wheel. Fig. 6 is a detached detail of the feeding-apertures of the seed-receptacle. Fig. 7 is a cross-sectional detail on the line *b b* of Fig. 2.

The grain-receptacle is formed of the fabric sack 1, having the base 2, generally of wood, forming the bottom of the sack. The sack will be supplied with the usual strap 4, by which the sack and the mechanism carried thereby may be suspended from the shoulders of the operator, and the base 2 will be provided with a handle 5 for the left hand of the operator to enable him to steady the device.

6 is a vertical shaft having its upper end revoluble in and projecting through a disk 7, fast upon the base 2, and having its lower end stepped in and supported by a spider-frame 8, also attached to the base. Attached to the shaft 6 below the disk 7 is a hub $8^a$, connected to an annular rim 9 by inclined radiating arms 10, and extending outward from this rim is a disk 11, having radiating arms 12 extending therefrom, and with vertical ribs 13 on the upper sides of the arms and disk, and also radiating from the rim 9, the whole constituting one of the distributing-wheels.

Fast upon the shaft 6 near its lower end is a gear-wheel 14, engaging a similar-sized wheel 15 on a counter-shaft 16, mounted revolubly in the spider-frame 8, and upon this same counter-shaft, above the gear 15, is another preferably smaller gear 17, engaging a larger gear-wheel 18 on another counter-shaft 19, also mounted revolubly in the spider-frame.

Fixed upon the shaft 19 below the gear 18 is a bevel-pinion 20, adapted to be engaged by a similar bevel-pinion 21 on a transverse shaft 22, having an operating-crank 23, by which means the distributing-wheel may be rapidly revolved by turning the crank 23.

Fitting loosely upon the shaft 6 is a sleeve 24, having a pinion 25, engaging the larger gear 18, and also having a second distributing-wheel 26 attached thereto, this distributing-wheel being formed of the central imperforate portion 26′, radiating arms 27, and vertical radiating ribs 27′, as shown.

The imperforate portions of the distributing-wheels are slightly concave or disk-shaped, as shown in Fig. 3, and the radiating arms trend slightly upward and outward therefrom, as shown, so that the grain will be thrown upward at the same time that it is thrown outward to increase the distance to which it will be thrown. By this construction it will be understood that both distributing-wheels will be rapidly revolved at the same speed by the action of the single crank-handle 23, but in opposite directions.

The disk 7 is attached to the under side of the base 2 below a circular cavity 28 through the base and conforming to the disk, as shown in Fig. 3. This disk 7 is provided with two perforations 29 30, and on the under side of the disks, adjacent to the perforation 30, is secured a small deflecting-plate 31, which serves as a chute to convey all the grain which falls through the perforation 30 off to one side outside the rim 9. The perforation 29 comes directly above the open central portion of the upper distributing-wheel, so that all the grain which passes through the perforation 29 falls through the center of the upper wheel upon the lower wheel and does not reach the distributing part of the upper wheel. Thus the grain passing from the receptacle will be equally distributed, one half being fed to the upper wheel and the other half fed to the lower wheel.

The shaft 6 projects above the disk 7 for a short distance, as shown in Fig. 3, and is provided with laterally-projecting arms $6^a$, which revolve with the shaft and project across the perforations and serve as agitators to keep the seed in constant motion in the bottom of the receptacle and prevent the same from clogging or choking the perforations. The agitators also serve to feed the seed uniformly to the perforations, so that an equal amount will be caused to pass through each perforation.

The inclined arms 10 serve an important purpose, as they aid in the distribution by throwing the grain outward upon the lower distributer to a point equal to the distance from the center which the deflecting-plate 31 carries the grain that falls through the perforation 30. Thus both distributers will receive their supply of grain at points equidistant from the center, so that the grain will be thrown from both with uniform force and distribute to a uniform distance on each side.

A combined seed-gage and valve in the form of a plate 32, having a recess 33, is supported beneath the base by guides 34 (see Fig. 4) and adapted to be adjusted by a lever 35 to be projected over the openings 29 and 30 to open the same to any desired extent to regulate the amount of grain passing through the perforations, and thus regulate the "feed" of the device and also to entirely cut off the supply, as required. Thus the device may be readily adapted to the requirements and the quality, condition, or size of the seed to be sown. By this means a machine will be produced which will distribute double the quantity of seed of any other machine and do the work in a more satisfactory and uniform manner and cover twice as much ground as a single-wheel machine and in the same time. The seed is thus distributed equally on each side and will enable the machine to be moved over the ground with twice the speed of the single machine to feed the same amount of grain and will not materially exceed in price or weight the ordinary single-wheel machine.

The principal advantage of this structure is that the seed is distributed from right to left and from left to right at the same time and at a uniform speed, thus producing a very uniform spread of seed over a wider area than can be accomplished with a single-wheel machine, which necessarily throws more grain on one side than the other.

The construction of the distributing-wheels is an important feature of our invention, these wheels each being formed of a single piece of sheet metal with the portion where the radiating arms occur crimped together, as shown in Fig. 7, which represents a cross-section of a portion of one of the ribs and the body of the wheel adjacent thereto. By this simple means the construction of the distributing-wheels is greatly simplified and cheapened, and a very strong light wheel is produced, which will effectually do the work required and at the same time resist the heavy strains to which it will be subjected.

What we claim as new is—

1. In a broadcast seeder, the combination of a lower distributing-wheel, an upper distributing-wheel having a central opening, and means to supply seed to said upper distributing-wheel at a point on one side of the central opening thereof and to supply seed to said lower distributing-wheel through said central opening in said upper distributing-wheel, substantially as described.

2. In a broadcast seeder, the combination of a lower distributing-wheel, an upper distributing-wheel having a central opening, and means to supply seed to said upper distributing-wheel at a point on one side of the central opening thereof and to supply seed to said lower distributing-wheel through said central opening in said upper distributing-wheel, and means to deflect the seed while falling onto the said lower distributing-wheel, outwardly from the center thereof, substantially as described.

3. In a broadcast seeder, the combination of a lower distributing-wheel, an upper distributing-wheel having a central opening, and a seed-receptacle having discharge-openings, one above said central opening in the upper distributing-wheel and the other to one side of said central opening, substantially as described.

4. In a broadcast seeder, the combination of a lower distributing-wheel, an upper distributing-wheel having a central opening, a seed-receptacle having discharge-openings, one above said central opening in the upper distributing-wheel and the other to one side of said central opening, and a valve to close and uncover said openings, substantially as described.

5. In a seeding-machine, a receptacle for the seed, a lower imperforate distributing-wheel, an upper distributing-wheel disposed above said lower wheel and having a central opening with inclined radiating arms within said opening, means for revolving said wheels in opposite directions, means for supplying seed to said upper wheel, and means for supplying seed to said lower wheel through said central opening and in contact with said inclined arms, substantially as described.

6. In a seeding-machine, the combination of a seed-receptacle, a vertical shaft connected below said receptacle, means for revolving said shaft, a lower distributing-wheel connected to be revolved by said shaft, an upper distributing-wheel connected to be revolved by said shaft in the opposite direction from said lower wheel, and means for supplying seed to said wheels in equal quantities, substantially as described.

7. In a grain-seeding machine, a receptacle for the seed having two perforations therein, two superimposed distributing-wheels disposed below said receptacle, means for revolving said wheels in opposite directions, means whereby seed may be conducted to said lower wheel through one of said openings, and means whereby seed may be conducted to the other of said wheels through the other of said openings, substantially as described.

8. In a seeding-machine, an imperforate lower distributing-wheel, an upper distributing-wheel having a central opening and disposed above said imperforate wheel, means for revolving said wheels in opposite directions, a seed-receptacle having two perforations above said central opening in said upper wheel, and a deflecting-plate below one of said openings and disposed to convey the seed passing through said opening to said upper wheel outside said central opening whereby each of said wheels will be supplied with seed simultaneously and in equal quantities, substantially as described.

9. In a seeding-machine, a seed-receptacle having an aperture in its lower side, a plate having two perforations and disposed over said aperture, a vertical shaft journaled through said plate, transverse arms carried by said shaft above said plate and projecting over said perforations, a lower imperforate distributing-wheel revolubly mounted upon said shaft, an upper distributing-wheel having a central opening and revolubly mounted upon said shaft above said imperforate wheel, a deflector-plate disposed beneath said plate and adapted to convey the seed passing through one of said perforations to said upper distributing-wheel outside of its central opening, and means for revolving said wheels in opposite directions, substantially as described.

10. In a broadcast seeder, the combination of a lower distributing-wheel, an upper distributing-wheel having a central opening, a seed-receptacle having discharge-openings, one above said central opening in the upper distributing-wheel and the other to one side of said central opening, and a deflector below said discharge-opening, substantially as described.

11. In a broadcast seeder, the combination of a lower distributing-wheel, an upper distributing-wheel having a central opening, a seed-receptacle having discharge-openings, one above said central opening in the upper distributing-wheel and the other to one side of said central opening, and a stirrer above said discharge-openings, substantially as described.

In testimony that we claim the foregoing as our own we have hereto affixed our signatures in the presence of two witnesses.

JAMES C. ABBOTT.
ELI ABBOTT.

Witnesses:
JOHN GRAFTON,
S. H. SICKAFOTH.